United States Patent [19]
Browne et al.

[11] Patent Number: 5,608,711
[45] Date of Patent: Mar. 4, 1997

[54] METHOD AND MEANS FOR CHANGING PIT DEPTH ON AN OPTICAL RECORDABLE MEDIUM

[75] Inventors: John F. Browne, Laguna Niguel; Richard L. Wilkinson, La Mirada; William W. Boyle, Covina, all of Calif.

[73] Assignee: Optical Disc Corporation, Santa Fe Springs, Calif.

[21] Appl. No.: 400,671

[22] Filed: Mar. 8, 1995

[51] Int. Cl.$^6$ ..................................................... G11B 7/00
[52] U.S. Cl. ........................................... 369/116; 369/124
[58] Field of Search ................................... 369/124, 111, 369/54, 58, 48, 116, 47

[56] References Cited

U.S. PATENT DOCUMENTS

| | | | |
|---|---|---|---|
| 4,162,398 | 7/1979 | Kayanuma | 369/111 |
| 5,297,129 | 3/1994 | Wilkinson et al. | 369/124 |

*Primary Examiner*—Nabil Hindi
*Attorney, Agent, or Firm*—Ladas & Parry

[57] ABSTRACT

Method and apparatus for improving the characteristics of the surface effects on a replicated optical disc the master for which is recorded on an optical recording apparatus which includes a writing light beam source and an optical modulator for modulating the intensity of the writing beam of light above and below a threshold level of a moving recording medium in response to a modulator drive signal for recording information on the medium, the light beam being capable of forming a track of surface effects or indicia in the moving master recording medium when the writing beam is above threshold and incapable of forming surface effects in the moving recording medium when the writing beam is below threshold. The method includes receiving a substantially rectangular waveform intended to control the optical modulator. A radius dependent duty cycle ramp function is introduced into the optical modulator drive signal for altering the depth or height of recorded pits or bumps on the recording medium to compensate for the depth or height versus radius phenomenon experienced in the molding process.

7 Claims, 2 Drawing Sheets

METHOD AND MEANS FOR CHANGING PIT DEPTH ON AN OPTICAL RECORDABLE MEDIUM

BACKGROUND OF THE INVENTION

1. Field of the Invention

The present invention relates to the field of signal processing systems, and in particular to the field of waveform shaping in optical information recording systems. More specifically, the present invention relates to a dynamic optical modulator regulator and waveform shaping system employed in an optical disc mastering apparatus for improving the character and resolution of the indicia in a replicated optical disc while maintaining proper duty cycle and asymmetry of the recorded information.

2. Brief Description of the Prior Art

A great many systems are known for optically recording information on light responsive media. Digital information as well as analog information can be recorded on a variety of media, including photoresists, photochromic materials, and thermally responsive materials in the form of discs, drums, and tape.

Virtually all of these known systems employ some form of pulse code modulation (PCM) or frequency modulation (FM) due to the nonlinearities of known optical recording media. Additionally, virtually all of these known systems employ an optical system including an objective lens for focusing the writing beam of light to a small spot on the light sensitive surface of the medium. In order to maximize the information density of the recorded material, it is necessary to focus the writing beam to the smallest possible spot size. Due to diffraction effects, a focussed beam of coherent radiation forms a central bright spot surrounded by concentric spaced rings of light known as an Airy disc, having an approximately Gaussian power distribution. The diameter of the central spot of light is defined by the wavelength of the recording light and the numerical aperture (NA) of the objective lens.

Most optical recording media exhibit a threshold effect, meaning that a level of laser writing beam power density exists above which the medium will be altered, and below which the medium will not be altered. Since the power density of the focussed writing beam varies as a function of the distance from the center of the central spot, it is possible to form altered areas on a medium which are smaller than the diameter of the central spot of the focussed light. In order to obtain an altered area of a specific size, the prior art has taught that it is merely necessary to adjust the peak intensity of the modulated beam such that the power density of the focussed spot at the specified diameter is equal to threshold level of the recording medium. Experimental results indicate that this technique works extremely well when there is no relative movement between the writing spot and the medium and no thermal conductivity effects diffusing the energy absorbed by the medium. In all practical systems, however, relative movement between the medium and the recording spot is necessary. This relative movement greatly complicates the calculation of the amount of energy absorbed by a particular region of the medium.

All light responsive media exhibit a tendency to integrate the amount of energy received over a period of time, so that the threshold level of the material does not define a specific instantaneous power density at which the material is altered, but rather defines an energy density which is the result of an integration of the received power over the time during which the power is received. In other words, the threshold level for the materials is actually an exposure level. Exposure level is defined as the radiant flux per unit area integrated over the exposure time. The radiant flux irradiating a particular point on the medium at a particular time is a function of the position of the point within the focussed spot, as well as the instantaneous modulation level of the writing beam. Specifically, the exposure level at a particular point on the medium is equal to the convolution integral of the instantaneous power of the modulated writing beam as a function of time and the power density distribution function defined by the path and speed of the particular point of the medium through the focussed spot, evaluated over the exposure time. Since the power distribution of the focussed spot varies in two dimensions, the exposure level over the medium defines a three dimensional graph. The intersection points of this graph with a planar "slice" through the graph at the altitude corresponding to the threshold level of the medium maps the boundaries of the altered areas on the medium.

An important concept in determining the effect of the finite size of the recording spot is the concept of the spatial frequency of the information on the moving recording medium. This is the subject of U.S. Pat. No. 4,616,356 which is incorporated herein by reference.

Also incorporated herein by reference is U.S. Pat. No. 4,225,873 describing signal processing techniques to achieve proper duty cycle of the recorded information and to minimize second harmonic distortion of the recorded information which are related parameters and which are improved by the present invention. In this description, the duty cycle of the recorded information will be referenced in detail, it being understood that second harmonic distortion is proportional thereto. That is, when duty cycle is controlled to approximately 50%, this minimizes the second harmonic distortion of the recorded information.

As previously indicated, when recording on a medium using laser light, the effects of the recording process may either be an ablation of the recording surface, a discoloration of the surface, a photo-hardening or a photo-softening of a photoresist coated surface, a raised bump or bubble formation, and the like. In all cases, a recording medium is moving relative to an impinging light beam, and the energy of the light beam is increased and decreased about a threshold level so as to cause or not cause the desired effect, respectively. Also in all cases, when the light beam is first turned on or caused to exceed threshold, the full effect of the energy on the recording surface is not instantaneously realized. Rather, and especially with mediums that are thermally responsive, the recorded effect (i.e. indicia) increases with time due primarily to the temperature of the medium increasing with time under the influence of the applied energy. That is, when the light beam is first turned on, instantaneously no alteration in a moving recording surface can be detected. If left on continuously, the full effect of the impinging light beam will cause a wide stripe of the effect on the recording surface, thereby defining a broadening of the track of the light beam with the passage of time.

On the other hand, when the light beam is turned off or falls below threshold level, the effect of the lack of sufficient energy from the light beam is almost immediately recognized by the disc surface, since the downstream portion of the disc is cold and unaltered. Accordingly, when the light beam is turned off quickly, an almost instantaneous stoppage of the recording effect takes place, and since the light beam is substantially circular at the point of impingement on the recording surface, a rather blunt end on the trailing edge of the recorded indicia can be observed.

If the moving recording surface is therefore impinged by a light beam having a sharp rising leading edge and a sharp falling trailing edge, a rather "pear-shaped" or "teardrop-shaped" surface effect will be noted, the leading edge being tapered and widening to a constant width until the beam was shut off, at which point the recorded effect would define a rounded or blunted trailing end. This aspect of optical disc recording is the subject of U.S. Pat. No. 5,297,129 which is incorporated herein by reference.

While the aforementioned characteristics of the recorded surface results regardless of the recording "effect" chosen, for ease of discussion in this description, it will be assumed that the recording light beam causes an ablation of the surface, thereby producing a "pit". It is to be understood, however, that a bump, discoloration, photoresist hardening, photoresist softening, or other indicia can be substituted for the term "pit" without departing from the nature of the technical description of the recording effect. It is further to be recognized that the term "pit" as used herein would be equivalent to the bump or pit formed after development of a photoresist if that were chosen for the recording surface. For the purposes of discussion herein, the term "surface discontinuity" will be used as a generic term meaning either a bump or a pit or other surface disturbance departing from a flat unrecorded disc surface. Finally, the term "recording surface" refers to that part of the disc which is sensitive to the impingement of light energy, whether it be on the outer surface of the disc or submerged beneath the surface being impinged by the light beam. Although it would be theoretically possible to apply some of the concepts of the present invention to all types of prior art mastering processes, from a practical viewpoint only recording processes which create physical "pits" or "bumps" will benefit, as will only mastering systems that permit direct-read-after-write (DRAW) disc mastering. Thus, photoresist type mastering systems cannot make use of the invention. This will be detailed later in this description.

One of the most important parameters in the recording of a compact disc (CD) master is the precise control of the pit-to-land ratio. Each transition from land to pit and vice versa marks a zero crossing of the EFM (Eight-to-Fourteen) signal; therefore, the size of the land area holds as much digital information as the size of the corresponding pits. The ratio of pit to land size is the "duty cycle" of the recording. A duty cycle of 50% would represent a symmetrical signal with pits occupying 50% of the track area and land area the other 50%. Any recording that deviates from a 50% duty cycle would be represented in an eye-pattern (discussed in connection with FIG. 2) as an asymmetrical signal. Due to limitations in the replication process, differences in the various CD player's optics, and variances in the players electronic boost, all CD recordings, even ones that were recorded with perfect 50–50 symmetry, may be seen by the playback optics as slightly asymmetrical. Circuitry within the CD player corrects for this asymmetry by shifting the "zero level" to a point where no timing differences between positive and negative half cycles exist.

The optical head of a player "reads" the information on a disc by focussing a laser beam to a spot about 1 micron in diameter and scanning this spot along a spiral track of pits and lands on the disc. The lands reflect most of the light back to a photodetector in the head, but the pits (actually read by the read laser from the opposite side of the disc where the pits are seen as bumps) reflect very little light back toward the read head. The photodetector generates an electrical signal proportional to the amount of light reflected by the area of the disc illuminated by the spot. Because the spot is diffraction limited and is only slightly larger in diameter than the length of the shortest length pit on the disc, the rise and fall times of the electrical signal are relatively rather slow, and the amplitude of the signal representing the smallest length pits is smaller than the amplitude of the signals representing the longer pits. The difference in amplitude varies from player to player because of differences in optical quality, and from disc to disc because of pit geometry. All players partially make up the difference in amplitude with an analog aperture compensation circuit which boosts the amplitude of the high frequency signals relative to the low frequency signals. Unfortunately, in the interests of economy, these boost circuits are not phase linear, so the harmonics of the signals are delayed by varying amounts, and the shape of the waveform is altered in addition to its amplitude.

The EFM signal recorded on a compact disc is a run length limited digital code which is self clocking and contains its digital information in the timing between transitions. On the disc, such transitions are the boundaries between pits and the lands between pits. Therefore, the length of each pit is a quantum of data and the length of each land between pits is also a quantum of data.

The rules for the EFM code according to CD standards require that each and every transition occur at one of nine allowed times after the last transition. More specifically, the period between any two transitions must be nT, where T is a fixed period of time (about 231 nanoseconds) and n is an integer between 3 and 11. In order to decode the information, the player must decide how many T's pass between each transition. The rate of rotation of the disc under the playback head is not stable enough to simply time the transitions with a fixed clock. Instead, a channel clock running at an average of one cycle per T (4.3218 Mhz) is phase locked to the recovered signal. This PLL (phase locked loop) operates by comparing the timing of each transition in the signal with the closest cycle end of the clock. If the transition consistently occurs just before a cycle end of the clock, the clock slowly speeds up until the transitions occur exactly at a cycle end.

Unfortunately, the rise and fall times of the analog signal from the disc are relatively long and may exceed T, so a specific voltage must be chosen to define the instant of the transition. This voltage is the player's "Decision Level". The player chooses this level with the help of another rule of the EFM code which states that, on the average (and ideally), the EFM signal will be "high" for exactly the same amount of time, on average, that it is low. Knowing this, if a player picks a decision point too high in voltage, the EFM signal will be low (lower than the decision point) more often than it is high (higher than the decision point). A servo loop in the player slowly adjusts the limit voltage to find and maintain the proper decision level voltage.

It is important to realize that the player cannot change its decision level on a cycle by cycle basis, but the period between the transitions can vary from 3T to 11T instantly. Any frequency dependent influences on the shape of the waveform may cause the ideal decision point for the high frequency segments of the signal to be at a different voltage than the ideal decision point for the low frequency segments of the signal. The player will choose a decision point which is an average of these voltages. As mentioned earlier, the boost circuitry of the player is not phase linear and therefore causes a "spread" in the ideal decision point voltages with frequency.

In order to read the signal from the disc, the player must keep the small spot of light centered over the moving spiral track of pits on the disc. Various techniques are used for detecting the position of the spot relative to the track, and tracking devices of some players (using single-beam or push-pull trackers) are greatly influenced by the average duty cycle of the pits along the track. That is, these players will only reliably follow along the center of the track if the track consists of a certain percentage of pit area greater than the non-pit area (a duty cycle greater than 50%). While recorded intelligence information is contained in both the pits and the lands, no tracking information is contained in the lands which are coplaner with the other unrecorded regions of the disc surface, i.e. the surface of the disc between tracks of pits. Accordingly, the greater the length of the pit relative to the land between pits, the better the tracking subsystem works. As indicated, with any duty cycle less than about 50%, there is insufficient tracking information to enable push-pull trackers to stay on track. One solution to this dilemma, then, would be to increase the pit-to-land duty cycle to above 50% and rely upon the player's ability to readjust its "decision level" to compensate for the increase in recorded duty cycle. However, in order for the player's PLL to maintain a channel clock based on the EFM signal, the increase in the duty cycle must be uniform over the entire signal, but this does not happen because there is not an equal proportional increase in pit length over the nine different pit sizes (3T to 11T). A 3T pit will obviously have a greater geometric increase, percentage wise, than will a 6T or an 11T pit. Unfortunately, therefore, departing from a 50% duty cycle just to accommodate single-beam trackers sacrifices symmetry, and if asymmetry is too great, the player's phase lock loop may not be able to lock to the recovered signal.

Another consideration which has heretofore not been adequately provided for in the recording process is the fact that single-beam players, whose tracking function depends on the amount of light deflected back to the photo-sensor in the direction of the tracking error, operate best with tapered (pointed) ends on the pits formed in the recording surface. The ideal pit would be an elongated groove with an apex on the bottom of the pit, similar to the impression that would be made by an upside down pyramid. The more the slope of the sides and the more tapered the ends, the better. Accordingly, any attempt to improve the pit definition tends to create a flat plateau region and eliminate the long narrow and tapered leading edges of the pits making tracking more difficult for such single-beam players. Moreover, pit length varies greatly pit-to-pit, i.e., from 3T to 11T, and a 3T width pit or land can be placed directly adjacent to an 11T pit or land. If the peak power level is increased to produce rounded (less tapered) higher definition 3T pits, the same peak power level applied when forming an 11T pit would produce a very wide or blunted trailing end portion. This difference in geometry between 3T and 11T pits creates differential symmetry where the 3T pits have one symmetry and the 11T pits have another symmetry configuration, and this causes problems with player decoders. Ideally, there should be the same symmetry on each pit size. Otherwise, there will be a "spread in pattern" in the eye-pattern (discussed in connection with FIG. 2).

There is yet another phenomena which contributes to degraded optical disc replicas, and that concerns the variation of pit depth as a function of radius. It has been determined that even with a "perfect" stamper, pit depth in a replica varies according to radius apparently due to the lack of proper temperature and pressure at larger radii, the pits becoming shallower toward the outer edge of the replica.

It can therefore be appreciated that without the background knowledge discussed above, a simplistic master recorder design would simply maintain a 50% duty cycle in the recorded information. In the ideal world, this would seem to be an obvious thing to do, since maintaining a 50% duty cycle would appear to be an essential requirement for the recording process. Methods and apparatuses of the distant prior art have thus merely provided a rectangular waveform in which the portion representing an nT length pit is equal in length to that portion of the waveform representing an nT length land between pits.

With experience, it has become evident that many factors must be considered in order to produce the optimal track of pits on the disc. For example, since the depth of a pit and its width vary along the track with the amount of time the beam is allowed to impinge on the surface, pit size and geometry is a function of surface speed—an important factor for discs recorded in a constant angular velocity format. Other factors to be considered, already discussed, are duty cycle (>50%), the shape of the side walls of the pits in elevation (important for single-beam trackers), asymmetry, and pit resolution.

Pulse length can be increased to raise the duty cycle, but this increases asymmetry. Increasing the power level of the modulated light beam improves resolution at the leading edge and increases duty cycle but produces "pear-shaped" trailing edges and excessive asymmetry. Increasing peak power at the leading edge by using a stepped modulator driving pulse improves resolution of the leading edge but requires a reduction of pulse length to keep the duty cycle under control. Doing so gives unequal asymmetry for the different pulse lengths and requires an adjustment for each surface speed for best results. Threshold can be lowered to increase duty cycle, but this produces poorer resolution in the leading edges of the pits and ill-defined pit widths exhibiting substantial difference in geometrical shapes between a 3T and 11T pulse length. Finally, any attempts to increase pit resolution inherently diminishes the ability of single-beam trackers to track.

It can thus be appreciated that, while many adjustments of the parameters affecting the timing and geometry of the pits are available, the interaction by making any adjustment which affects other parameters is a tremendous problem which reduces yield and requires constant attention by a recording operator.

There is therefore a need in the art for a method and apparatus for driving the light modulator with a pulse which permits independent control over geometry and asymmetry over wider ranges than heretofore possible. The method and apparatus should permit adjustment of pulse length and power to optimize asymmetry and permit adjustment of the geometry of the pits over the entire surface of the disc. This rather independent control of these parameters is extremely important when considering that for any given process for manufacturing discs, taking into account the differences in chemicals, surface thicknesses on the disc, molding machines, and mastering machines, any particular system would require a different adjustment to obtain optimal pit geometry and asymmetry, and the prior art has failed to provide this flexibility by being unable to control certain of the parameters independently. The present invention therefore satisfies a long need in the art for a method and apparatus which not only can permit optimal adjustment of the modulator driving pulse for a particular system but can also be adjustable to account for differences system-to-system.

SUMMARY OF THE INVENTION

The invention provides a uniquely altered modulator drive signal for use in an optical recording apparatus by providing a waveform processing means which receives a rectangular wave from the EFM processor, otherwise provided as a modulator drive signal to modulate the light beam, and produces therefrom a modulator drive signal which dynamically varies in accordance with the position along the recorded information track, or in accordance with predetermined recorded information characteristics, or both. In a preferred embodiment of the invention, the modulator drive signal is dynamically altered as a function of radius on an optical disc, as a function of the width of pulses which form surface discontinuities of proportional lengths along the information track, or both.

The remaining discussion assumes, but is not to be limited to, the use of a compact disc mastering machine which forms pits in the recordable surface of the disc and is capable of reading the recorded information instantly after it is recorded, i.e. the mastering machine is of a DRAW type. It is also presumed that the optical modulator used is an acousto-optical modulator, or AOM.

To compensate for inaccurate injection molding at the outer radius of a compact disc, the pit geometry is modified, in accordance with the invention, in a manner that offsets the lack of fidelity in molding.

Towards the outer radii of a molded disc, the pits containing the data tend to be molded increasingly shallower than the rest of the disc. These shallower pits result in a lower signal during playback, and an associated rise in the error rate. By making the pits at the outer radii increasingly deeper during mastering, the detrimental effects of the molding can be cancelled out.

Contained within the machine controller of a compact disc mastering machine is a microcontroller and its associated firmware, which produces and controls the function of a duty cycle ramp. This microcontroller continuously monitors the current radius, and adjusts the recording duty cycle in small steps accordingly. The values for these steps, and the radii at which they occur, are contained in a selectable pre-programmed look-up table. The actual output that effects the change in duty cycle is a slowly changing DC voltage from a digital-to-analog converter in a radius-to-voltage converter. This ramping voltage, in turn, is routed to a wave shaping circuit to alter the recording duty cycle.

The ramping DC voltage from the machine controller is summed with the AOM bias voltage in the wave shaping circuit. The resulting voltage sets the charging current on timing capacitors for the one-shots that determine the duty cycle. The output waveform from the wave shaping circuit is routed to the AOM which modulates the record laser beam, and it in turn records the pits in, for example, the recording surface of a dye-polymer media.

A duty cycle servo utilizes DRAW technology to adjust the recording laser power to maintain a set playback asymmetry. By making the record duty cycle smaller, the laser power must increase to maintain a constant playback asymmetry. Another effect of the higher laser power is an increase in the recorded pit depth. This increase in pit depth is the objective of the duty cycle ramp technology.

BRIEF DESCRIPTION OF THE DRAWINGS

These and other features and advantages of the present invention will be apparent from the following description of a particular embodiment of the invention, having reference to the attached drawings in which.

DETAILED DESCRIPTION OF PREFERRED EMBODIMENT

Figure 1:
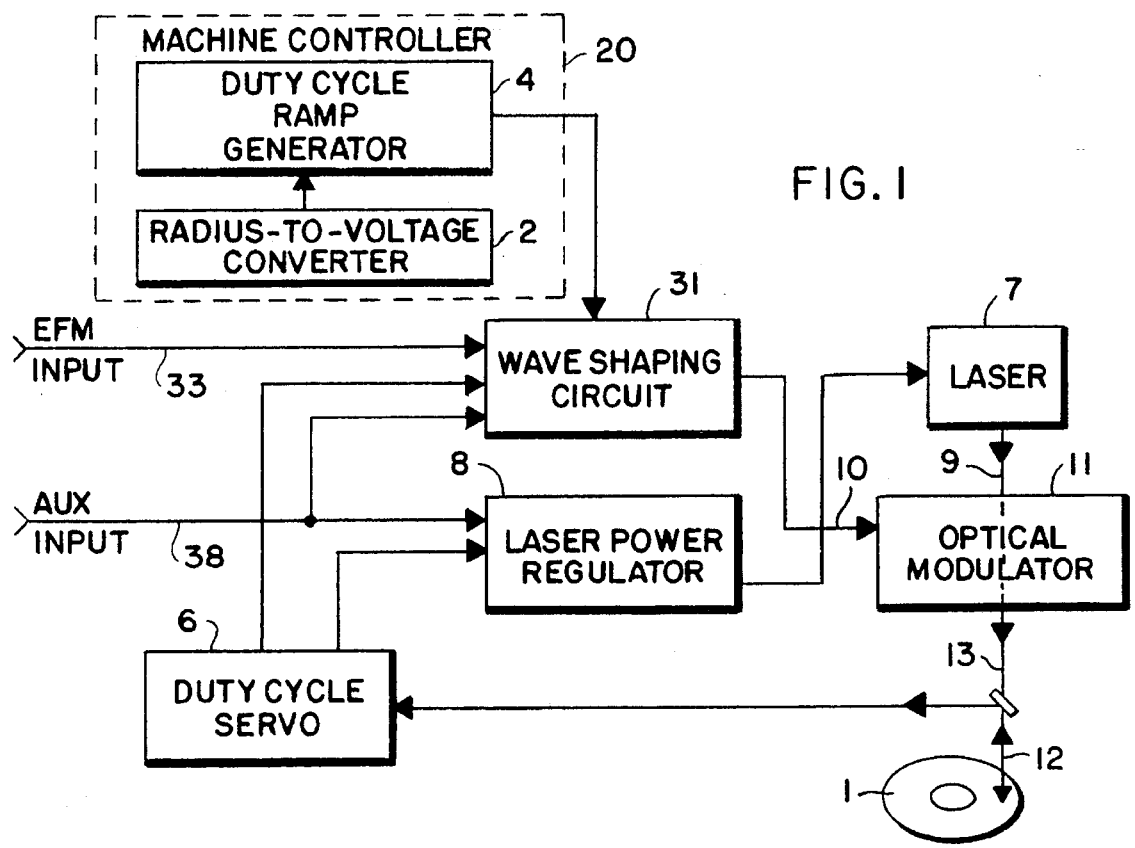
FIG. 1 is a generalized block diagram of a recording apparatus employing the waveform shaping circuit according to the present invention.

The diagram of the recording apparatus of FIG. 1 includes only those prior art features of the apparatus which are pertinent to the novelty of the present invention. For a description of a complete optical recording apparatus, reference is made to the aforementioned U.S. Pat. No. 4,225,873.

Figure 3:
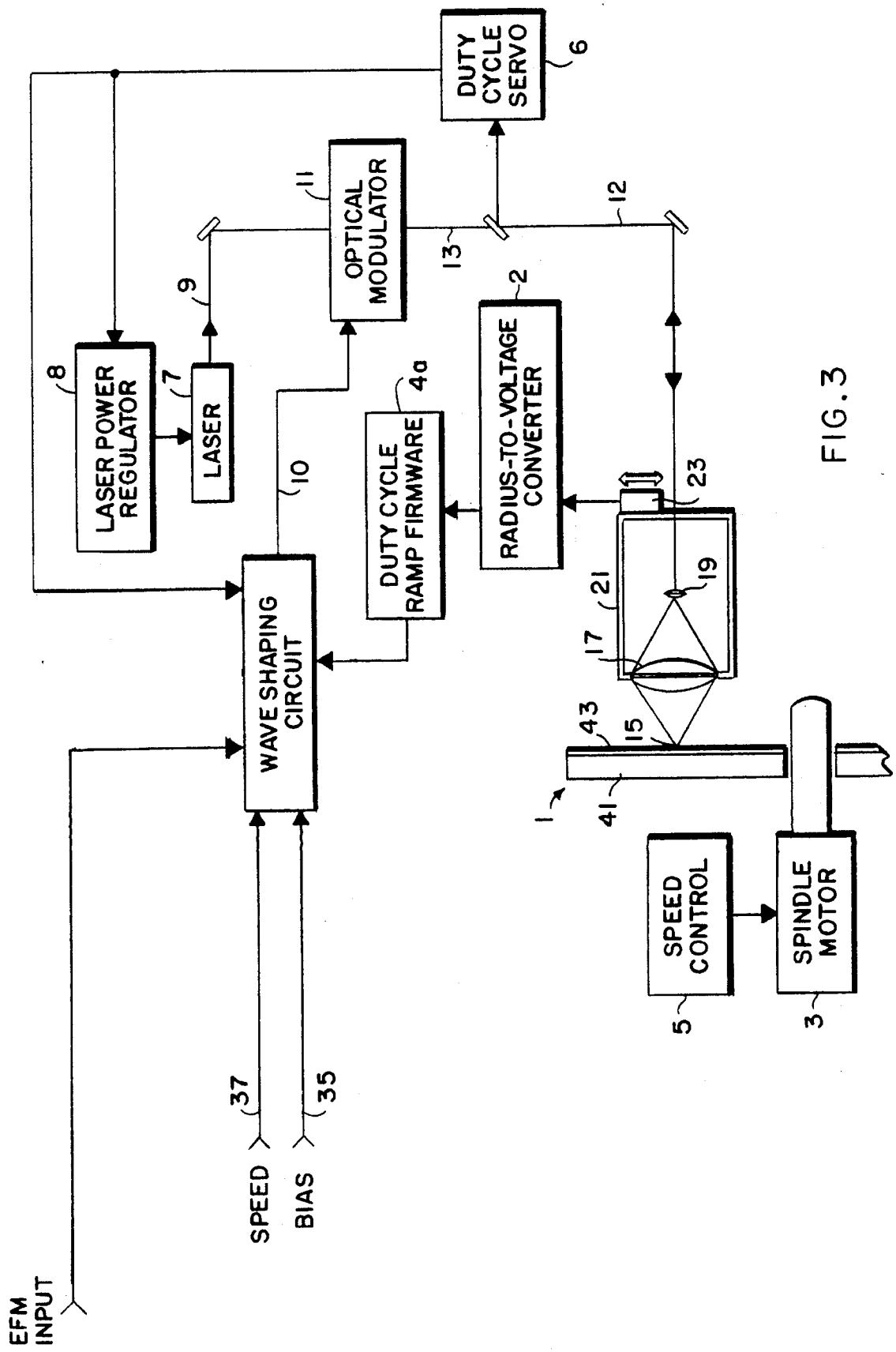
FIG. 3 is a more detailed block diagram than that of FIG. 2, and additionally shows a pulse discrimination and shaping function.

The recording apparatus shown in FIGS. 1 and 3 is designed for recording information on a rotating disc-shaped medium 1. The disc is rotated by a spindle motor 3 which is controlled by a speed controller 5 (FIG. 3). Naturally, the medium could be in the form of a drum, a card, or a linear tape with the necessary modifications of the media moving systems being obvious to a skilled artisan.

A laser or similar high intensity light source 7 forms a writing beam 9 of a particular wavelength of light. The writing beam passes through an optical modulator 11 which varies the intensity of the writing beam in accordance with a drive signal on line 10. By way of example, the modulator 11 may be an acousto-optical modulator (AOM).

The beam 13 exiting the modulator will have an amplitude of modulation proportional to the amplitude of the drive signal and will have an average intensity controlled by the DC offset of the drive signal and the intensity of the unmodulated beam 9.

The modulated beam 13 is directed to the recording medium 1 and is focused to a spot 15 by appropriate optics. These optics preferably include an objective lens 17 and a beam expanding lens 19 which spreads the beam from the modulator to fill the aperture of the objective lens 17. In the disclosed embodiment, the lenses 17 and 19 are mounted on a carriage 21 to allow radial movement of the spot 15 relative to the disc 1. Naturally, various other arrangements are possible for moving the spot 15 relative to the medium, including the movement of the spindle motor. In the disclosed embodiment, the carriage is moved by a translational drive system shown schematically at 23.

The drive signal for the optical modulator 11 is formed by a waveform shaping circuit 31. The waveform shaping circuit includes an EFM input 33 (FIG. 1) or a processed EFM input 26 (FIG. 3) defining for receiving the information to be recorded and may also include an input 35 for receiving a drive signal bias control for adjusting the average intensity of the modulated beam 13 (FIG. 3 only). If the speed of the information medium relative to the focussed spot 15 is not constant, the signal processing system may include an input 37 for receiving a signal indicative of the instantaneous relative speed.

The recording medium 1 may include a substrate 41 and a light responsive recording layer 43 coated on the substrate.

A duty cycle servo 6 samples the "read" signal from disc 1 and sends correction signals to the wave shaping circuit 31 and laser power regulator 8 for, maintaining constant asymmetry.

Figure 2:
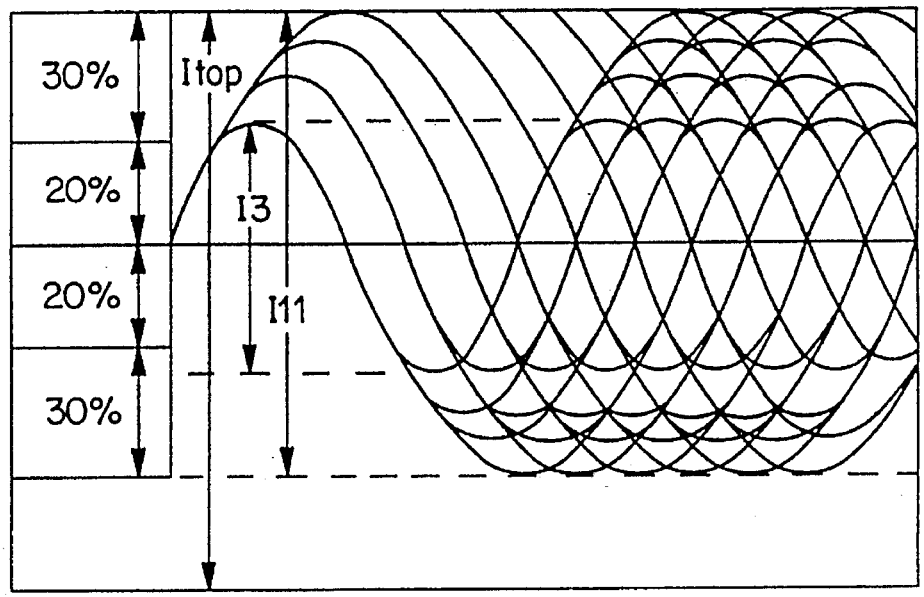
FIG. 2 is a representation of a perfectly symmetrical eye-pattern according to CD standard specifications.

FIG. 2 is a representation of a perfectly symmetrical "eye-pattern" which would be readily understood by one skilled in the art and is presented here merely to show the necessity for controlled asymmetry in the recovered signal in the player. The diamond-shaped formations along the horizontal center line shows perfect zero crossover of all waveforms. Producing the idealized "eye-pattern" as shown provides for the greatest immunity to noise. If, for example, the I3 waveform (representing a 3T length pit or land) were asymmetrical, i.e. the pit and land are not equal in length, a shift in one of the half cycles of the I3 waveform would not occur at the zero crossover point. If other waveforms also were asymmetrical to the point where it would be impossible along the horizontal center line of the graph of FIG. 2 to distinguish one nT signal from another nT signal, an improper signal would be recovered from the played disc and the phase lock loop may not be able to lock to the signal, thereby losing the self-generated clock and destroying the integrity of the played back signal, or such asymmetry could ever result in detecting the edges of the pits falling in the wrong cell created by the clock, again with disastrous results. The standard electrical output of the EFM processor for CD mastering for inputting on line 33, is a rectangular wave with a duty cycle average of about 50%, in spite of pulse-to-pulse variations in duration from 3T to 11T.

Generally, the present invention relates to analyzing the data stream from a direct read-after-write (DRAW) playback read head and adjusting the recording functions to make the playback signal as perfect as possible. In this way, as close to perfect playback of the discs by consumers can be realized, and yet the mold used in injection molding of replica discs can be imperfect. The signal driving the optical modulator 11 can likewise be imperfect, such imperfections being purposely put in place in order that the final product, the molded replica, or playback disc, will be perfect. This purposeful adjusting the mastering processing away from theoretical ideals can only be done, from a practical viewpoint, with mastering systems that can employ a real-time direct read-after-write (DRAW) function. Mastering processes that employ photoresist cannot realize the same success due to the need to completely manufacture a replica disc, test the replica, make further adjustments, and then replicate again. The time and cost of such a procedure to arrive at optimum parameters for producing a perfect replica is prohibitive.

Further, the present invention can only be used with a mastering system and recording medium combination which can produce continuous gradations in the physical properties of the recording surface, e.g. a combination which can produce different depths of pits (or heights of bumps) on the media surface. Again, recording media employing photoresist cannot be used, because they are incapable of producing different pit depths.

As indicated, a primary objective of the invention is to produce a correction signal, or compensation signal, intended to compensate for molding phenomena, where at the outer edge of the disk, typically what is observed is the molding process does not mold all pits with equal pit depth. The pits get shallow at the outer edge. There is not enough pressure and temperature to make a good copy of the pits at the outer edge of a CD or Videodisc mold.

The present invention solves this problem by forcing individual theoretically fixed pulse lengths to be nonconstant. As is known in the art, it is a goal of the molding processing to dynamically adjust the laser recording power to hold the pulse length constant (for a particular pulse type, e.g. 3T–11T) over the entire surface of the disc. In the present invention, however, the pulse length is purposely altered by a ramp function inserted to be effective for all radii or to be inserted at a certain radius. The ramp function is generated in a machine controller 20 shown to comprise a duty cycle ramp generator 4 which produces a ramped signal at its output coupled to wave shaping circuit 31. The ramped output level is determined by the radius of the write head of the mastering machine, and varies continuously as the radius of the write head changes. The ramp function may be linear, nonlinear, or follow any curve suitable for the particular disc type, size, and determined need for compensation, to make the surface discontinuities deeper or shallower at the outer edge. In a typical DRAW mastering machine, the ramp function makes the pits deeper with increasing radius.

Because a high speed duty cycle loop through duty use servo 6 is still working, still holding the asymmetry constant, when the radius dependent variable voltage level ramp function is inserted, the pulse length out of wave shaping circuit 31 gets shorter toward the outer radius of the disc, but the laser power rises under control of laser power regulator 8, and the asymmetry is still held constant. Thus, while the asymmetry is held constant, but the peak power is now greater, because the pulse length is shorter, the pits are made deeper as the recording process continues. Yet, the playback symmetry remains constant all across the surface of the disc. This combination of function may thus be referred to as a double nested servo loop, the ramp function effectively defining a low speed servo loop. It allows changing the pit depth and yet still maintaining constant asymmetry as a result of the two high and low speed servo loops. That is, when a compensating signal from duty cycle ramp generator is inserted into the servo loop, essentially causing the pulse length to get shorter, the laser power will increase to make up for the pulse length getting shorter, thereby producing constant asymmetry.

The constant asymmetry is due to the high speed pulse width servo loop comprising duty cycle servo 6, wave shaping circuit 31, optical modulator 11, and the read head (not shown) providing directly read information from the disc to servo 6. Thus, the high speed pulse width servo continues to do the same thing that it always has done, prior to implementing the present invention, that is, hold the asymmetry constant. But, the laser power, which has been holding the pulse length constant is, in accordance with the present invention, intentionally not being held constant, i.e. the laser power must increase for shorter pulse lengths in order to preserve asymmetry.

Employing this method, i.e., changing the depth of the pits as a function of radius without changing the asymmetry or virtually any of the other signals retrieved from an optical disc, is uniquely possible with DRAW mastering machines. Importantly, this method cannot be performed using a photoresist mastering procedure. The reason the aforedescribed method works with the type of optical disc recording technique with which the present invention is used, is that the recording medium used with the invention is not cut all the way through the recording layer. On the contrary, the depth of the pits follows the peak laser power.

As compared to the prior art, some prior art schemes propose to cause the write pulse to have a sharp and high power leading edge, sloping off more gradually toward the trailing edge. While this process indeed affects the shorter 3T pulses more than the longer 11T ones, due to the greater percentage of pulse time the leading edge contributes for the shorter pulses, this is solely an amplitude adjusting process. The present invention differs in that it dynamically sets write output pulse width to the optical modulator as a function of radius if the write beam.

It should be noted that the radius dependent compensation can be enabled from the beginning of the track on the disc to the end, or can be enabled at a prescribed radius. Also, the compensation can be continuous or can change incrementally at a prescribed radius. Of course, this complex scheme of adjusting the physical character of the write pulses is possible only on DRAW machines where instant results can be verified and parameters set for each processing channel. For example, in such a case, the eye pattern is real-time observable to insure a minimization of the phase errors of the zero crossings. In any event, by using the feedback from the disc as it is being recorded, the write pulses can be observed to be the right length and duration, or not, and appropriate correction functions can be initiated. This insures that what will be played back on the disc will be as perfect as possible.

Regarding the nature of the radius ramp circuitry, it may have a programmable compensation in it so that, rather than having the master formed perfectly, the master may be formed purposely not perfect (has a built-in precompensation-for-molding function) so that the replicas can be perfect. This additional function must, however, be open loop, i.e. such a pre-molding offset function would have to be preset rather than having a servo loop perform the function to make the master perfect.

All aspects of the invention relate to looking at the data stream input to the mastering machine, and using the playback information of the disc to make the data stream have the character it should for best playback of replicas, whether a master disc produced by such a process is perfect or is precompensated for molding. In all cases, the invention can be practically used only with a DRAW mastering machine using a recording media that can be recorded with pits of different depths or bumps of different heights.

Although the invention has been described in detail with reference to its presently preferred embodiment, it will be understood by one of ordinary skill in the art that various modifications can be made without departing from the spirit and scope of the invention. Accordingly, it is not intended that the invention be limited, except as by the appended claims.

We claim:

1. A dynamic waveform shaping circuit for use in an optical recording apparatus which includes a writing light beam source and an optical modulator for modulating the intensity of the writing beam of light above and below a threshold level of a moving recording medium in response to a modulator drive signal for recording information on a surface of the medium, the light beam being capable of forming a track of surface discontinuities in the moving recording medium when the writing beam is above the threshold and incapable of forming said track of surface discontinuities in the moving recording medium when the writing beam is below the threshold, said waveform shaping circuit comprising:

a wave shaping circuit, coupled to said modulator, for receiving a substantially rectangular waveform provided as said modulator drive signal to modulate the writing beam;

a duty cycle servo coupled to said wave shaping circuit for maintaining a predetermined duty cycle of surface discontinuities along said track; and wave shape modifying means, coupled to said wave shaping circuit, for altering the effects of said duty cycle servo to produce a modulator drive signal which forms surface discontinuities having a varying duty cycle along said track of surface discontinuities.

2. The dynamic waveform shaping circuit as claimed in claim 1, wherein said wave shape modifying means comprises a ramp voltage generator which applies a ramped voltage input to said wave shaping circuit for continuously altering said duty cycle between predetermined positions along said track of surface discontinuities.

3. The dynamic waveform shaping circuit as claimed in claim 2, wherein said recording medium is a disc, and said predetermined positions correlate with corresponding predetermined radii of the disc.

4. The dynamic waveform shaping circuit as claimed in claim 3, wherein:

said surface discontinuities are pits formed in said surface of said medium; and said wave shape modifying means produces a ramp voltage which continuously shortens the duty cycle of said pits along said track.

5. A dynamic waveform shaping circuit for use in an optical recording apparatus which includes a writing light beam source and an optical modulator for modulating the intensity of the writing beam of light above and below a threshold level of a moving recording medium in response to a modulator drive signal for recording information on a surface of the medium, the light beam being capable of forming a track of surface discontinuities in the moving recording medium when the writing beam is above the threshold and incapable of forming said track of surface discontinuities in the moving recording medium when the writing beam is below the threshold, said waveform shaping circuit comprising:

a wave shaping circuit, coupled to said modulator, for receiving a substantially rectangular waveform provided as said modulator drive signal to modulate the writing beam;

a duty cycle servo coupled to said wave shaping circuit for maintaining a predetermined duty cycle of surface discontinuities along said track;

wave shape modifying means, coupled to said wave shaping circuit, for altering the effects of said duty cycle servo to produce a modulator drive signal which forms surface discontinuities having a varying duty cycle along said track of surface discontinuities; and a light power regulator for varying the intensity of light produced by said writing light beam source, and wherein:

said duty cycle servo is coupled to said light power regulator for altering the intensity of light from said source in a manner to vary the duty cycle along said track of surface discontinuities oppositely from the variance of the duty cycle caused by said wave shape modifying means, thereby forming a closed loop servo function which allows the variation of duty cycle caused by said wave shape modifying means to be offset by the variation of duty cycle caused by altering the intensity of the write beam.

6. A dynamic waveform shaping circuit for use in an optical recording apparatus which includes a writing light beam source and an optical modulator for modulating the intensity of the writing beam of light above and below a threshold level of a moving recording medium in response to a modulator drive signal for recording information on a surface of the medium, the light beam being capable of forming a track of surface discontinuities in the moving recording medium when the writing beam is above the threshold and incapable of forming said track of surface discontinuities in the moving recording medium when the writing beam is below the threshold, said waveform shaping circuit comprising:

a wave shaping circuit, coupled to said modulator, for receiving a substantially rectangular waveform provided as said modulator drive signal to modulate the writing beam;

a duty cycle servo coupled to said wave shaping circuit for maintaining a predetermined duty cycle of surface discontinuities along said track;

wave shape modifying means, coupled to said wave shaping circuit, for altering the effects of said duty cycle servo to produce a modulator drive signal which forms surface discontinuities having a varying duty cycle along said track of surface discontinuities; and a light power regulator for varying the intensity of light produced by said writing beam source; and wherein:

said wave shape modifying means comprises a ramp voltage generator which applies a ramped voltage input to said wave shaping circuit for continuously altering said duty cycle between predetermined positions along said track of surface discontinuities;

said recording medium is a disc, and said predetermined positions correlate with corresponding predetermined radii of the disc;

said surface discontinuities are pits formed in said surface of said medium;

said wave shape modifying means produces a ramp voltage which continuously shortens the duty cycle of said pits along said track; and said duty cycle servo is coupled to said light power regulator for altering the intensity of light from said source in a manner to vary the duty cycle along said track of surface discontinuities oppositely from the variance of the duty cycle caused by said wave shape modifying means, thereby forming a closed loop servo function which allows the variation of duty cycle caused by said wave shape modifying means to be offset by the variation of duty cycle caused by altering the intensity of the write beam.

7. The dynamic waveform shaping circuit as claimed in claim 3, wherein said ramp voltage generator generates a stepped ramp for effecting incremental changes to the duty cycle servo along said track.

\* \* \* \* \*